US012681719B2

(12) United States Patent
Satyanaik et al.

(10) Patent No.: US 12,681,719 B2
(45) Date of Patent: Jul. 14, 2026

(54) LIVE KERNEL UPDATES UNDER MEMORY CONSTRAINTS

(71) Applicant: INTERNATIONAL BUSINESS MACHINES CORPORATION, Armonk, NY (US)

(72) Inventors: Shivarudrappa Satyanaik, Bengaluru (IN); Ravikishore Krishnamurthy, Bangalore (IN); Rizwan Sheikh Abdulla, Bangalore (IN); Veeresh Jumanal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 18/613,813

(22) Filed: Mar. 22, 2024

(65) Prior Publication Data

US 2025/0298607 A1 Sep. 25, 2025

(51) Int. Cl.
*G06F 8/656* (2018.01)
*G06F 9/455* (2018.01)

(52) U.S. Cl.
CPC .......... *G06F 8/656* (2018.02); *G06F 9/45558* (2013.01); *G06F 2009/45583* (2013.01)

(58) Field of Classification Search
CPC ............. G06F 8/60–66; G06F 9/45558; G06F 2009/45583
USPC .................................................. 717/168–178
See application file for complete search history.

(56) References Cited

U.S. PATENT DOCUMENTS

| | | | |
|---|---|---|---|
| 6,711,593 B1 | 3/2004 | Gordon et al. | |
| 9,626,180 B2 | 4/2017 | Barrat et al. | |
| 10,503,492 B2 | 12/2019 | Barrat et al. | |
| 2003/0182414 A1* | 9/2003 | O'Neill ................. G06F 8/658 |
| | | | 717/170 |
| 2017/0091002 A1* | 3/2017 | Chen ................... G06F 12/1441 |
| 2017/0344361 A1* | 11/2017 | Zhang ..................... G06F 8/654 |
| 2018/0101374 A1 | 4/2018 | Chittigala et al. | |
| 2021/0342274 A1 | 11/2021 | Bradshaw et al. | |

FOREIGN PATENT DOCUMENTS

WO WO-2012100535 A1 * 8/2012 ............. G06F 8/656

OTHER PUBLICATIONS

Yaozhong Ge et al., "Memory sharing for handling memory overload on physical machines in cloud data centers", https://journalofcloudcomputing.springeropen.com/articles/10.1186/s13677-023-00405-x, Feb. 28, 2023, 70 pages.

(Continued)

*Primary Examiner* — Geoffrey R St Leger
(74) *Attorney, Agent, or Firm* — Seed Intellectual Property Law Group LLP

(57) ABSTRACT

Embodiments detect a memory constraint in response to a live kernel update (LKU) operation being planned; acquire memory from an external entity through a hardware connection in response to detecting the memory constraint; perform the LKU operation using the acquired memory from the external entity; release the acquired memory; and output a success message which indicates that the LKU operation has been successfully completed in response to the acquired memory being released.

20 Claims, 8 Drawing Sheets

(56) References Cited

OTHER PUBLICATIONS

Kumar et al., "IBM AIX 7.2 Live Kernel Update for a reboot-free world!", https://www.ibm.com/support/pages/ibm-aix-72-live-kernel-update-reboot-free-world, Sep. 15, 2021, 4 pages.

Gibson, "Update your AIX system without a reboot!", http://gibsonnet.net/blog/cgaix/resource/AIX_7.2_Live_Update_a100000.pdf, Apr. 2018, 82 pages.

Chen et al., "Live Updating Operating Systems Using Virtualization", https://www.usenix.org/legacy/event/vee06/full_papers/p35-chen.pdf, Jun. 2006, 10 pages.

Anonymous, "Method to leverage HOT cache after Live Kernel Update", https://ip.com/IPCOM/000259696, Sep. 8, 2019, 4 pages.

Anonymous, "Method for LKU of set of LPARS of a server in coordinated way", https://ip.com/IPCOM/000259698, Sep. 8, 2019, 6 pages.

Anonymous, "Method to Eliminate Network Packet Loss During Live Kernel Update Blackout Time Through Use of a Service Proxy", https://ip.com/IPCOM/000256682, Dec. 19, 2018, 5 pages.

* cited by examiner

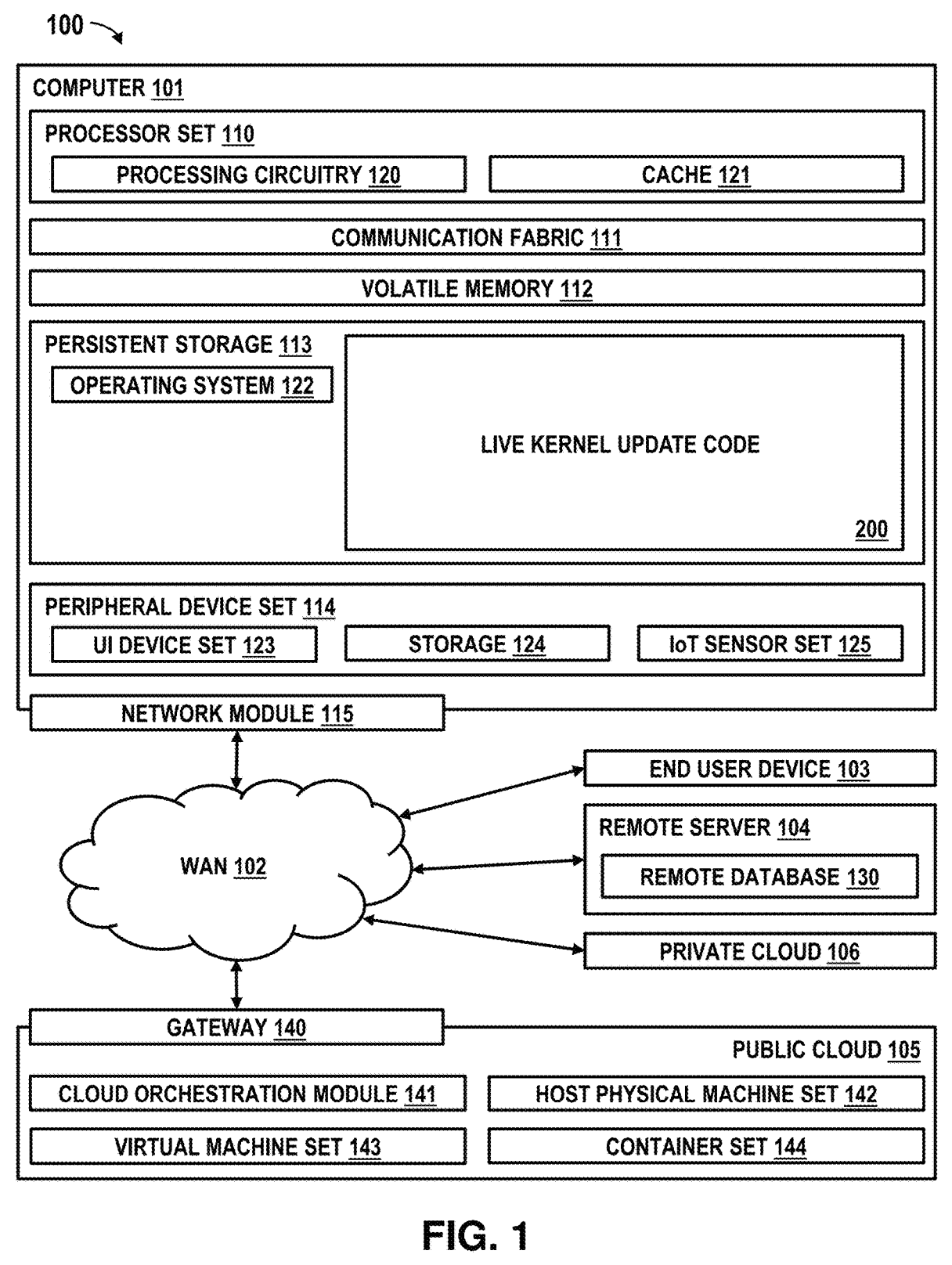

100

COMPUTER 101

PROCESSOR SET 110

PROCESSING CIRCUITRY 120 | CACHE 121

COMMUNICATION FABRIC 111

VOLATILE MEMORY 112

PERSISTENT STORAGE 113

OPERATING SYSTEM 122

LIVE KERNEL UPDATE CODE

200

PERIPHERAL DEVICE SET 114

UI DEVICE SET 123 | STORAGE 124 | IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

FIG. 1

LIVE KERNEL UPDATES UNDER MEMORY CONSTRAINTS

BACKGROUND

A cloud environment includes on-demand access of computing resources, such as physical servers, virtual servers, data storage, network capabilities, application development tools, software, artificial intelligence (AI) powered analytical tools, etc., to provide flexibility and scalability to users. For example, in the cloud environment, a live kernel update (LKU) updates an operating system (OS) without rebooting a system.

SUMMARY

In a first aspect of the invention, there is a computer-implemented method including: detecting, by a processor set, a memory constraint in response to a live kernel update (LKU) operation being planned; acquiring, by the processor set, memory from an external entity through a hardware connection in response to detecting the memory constraint; performing, by the processor set, the LKU operation using the acquired memory from the external entity; releasing, by the processor set, the acquired memory; and outputting, by the processor set, a success message which indicates that the LKU operation has been successfully completed in response to the acquired memory being released.

In another aspect of the invention, there is a computer program product including one or more computer readable storage media having program instructions collectively stored on the one or more computer readable storage media. The program instructions are executable to: detect a memory constraint in response to a live kernel update (LKU) operation being planned; acquire memory from an external entity through a hardware connection in response to detecting the memory constraint; perform the LKU operation using the acquired memory from the external entity; release the acquired memory; and output a success message which indicates that the LKU operation has been successfully completed in response to the acquired memory being released.

In another aspect of the invention, there is a system including a processor set, one or more computer readable storage media, and program instructions collectively stored on the one or more computer readable storage media. The program instructions are executable to: detect a memory constraint in response to a live kernel update (LKU) operation being planned; spin off a new virtual machine in response to detecting the memory constraint; acquire memory from an external entity through an open coherent accelerator processor interface (OpenCAPI) in response to detecting the memory constraint; perform the LKU operation to the new virtual machine using the acquired memory from the external entity; release the acquired memory; and output a success message which indicates that the LKU operation has been successfully completed in response to the acquired memory being released.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

DETAILED DESCRIPTION

Figure 2:
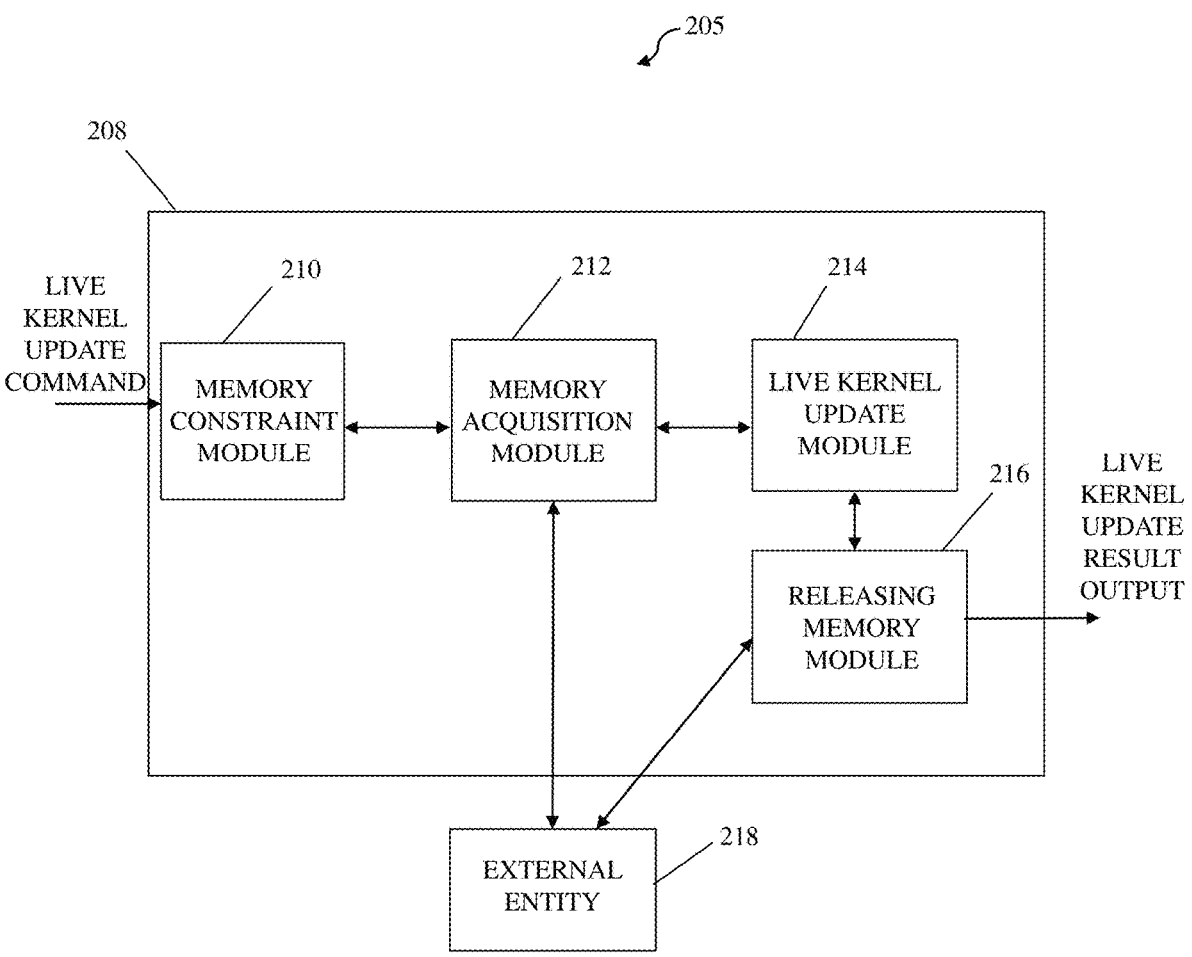
FIG. 2 shows a block diagram of an exemplary environment in accordance with aspects of the present invention.

Aspects of the present invention relate generally to performing live kernel updates under memory constraints. Embodiments of the present invention perform a live kernel update (LKU) of a virtual machine in response to a memory crunch issue. Aspects of the present invention create a new virtual machine (e.g., ambulance virtual machine) to keep a virtual machine image snapshot. In one example, the new virtual machine uses the same amount of resources, memory, central processing unit (CPU), input/output (I/O), and storage as an original virtual machine. Implementations of the present invention also provide a LKU operation in response to a system being unable to provide free memory resources. In this manner, embodiments of the present invention acquire memory from an external entity through a high speed interconnect interface designed to provide cache coherent communication. In accordance with aspects of the present invention, the LKU operation is performed by leveraging the acquired memory. In an example, the external entity comprises another external system that is connected to the system via a cache coherent bus architecture and which includes at least one of free shareable dynamic random access memory (DRAM), a storage class memory device, etc. In further embodiments, the cache coherent bus architecture comprises at least one of an open coherent accelerator processor interface (OpenCAPI), compute express link (CXL), etc. Implementations of the present invention utilize a cache coherency protocol such as OpenCAPI, CXL, etc. to ensure that memory is dynamically inserted into a real memory address space without any data inconsistencies.

Embodiments of the present invention provide a fast and simplified remote memory allocation with zero downtime for resource demanding nodes in a virtualized computer environment in which a live kernel update is performed or planned for a virtual machine. Aspects of the present invention dynamically increase a memory of a node through a high-speed interface designed to provide cache coherent communication. Implementations of the present invention borrow a target memory from at least one of a storage class memory device, another computer system connected in a memory inception cloud setup, and an electronic entity connected to a primary system processor through a high speed cache coherent interconnect. In further embodiments of the present invention, a virtual machine undergoing a LKU operation incorporates the target memory to ensure that there is no downtime.

Aspects of the present invention use a cloud environment to leverage existing models and tools (e.g., emgr command, install command, etc.) to allow for non-disruptive updating of a kernel. Embodiments of the present invention provide a checkpoint process for at least one partition in response to the workload being paused and a current state being saved. Aspects of the present invention also migrate a current process to a newer virtual machine in response to the checkpoint process being completed. Implementations of the present invention provide an open standard cache coherent interconnect (e.g., OpenCAPI, CXL, etc.) which allows for a high-speed, low-latency connection between two devices. In further embodiments, a first device of the two devices may be a host system and a second device of the two devices may be another system or an accelerator in which another memory or storage class device is connected to the first device. Further aspects of the present invention provide memory inception in which virtual machines are able to access memory that is physically located on another virtual machine or a different host in a cloud computing environment. In implementations of the present invention, virtual machine is able to access memory from a remote host or a different data center (in a similar manner as local memory) using memory inception. Accordingly, embodiments of the present invention provide zero downtime and dynamic live kernel updates.

Embodiments of the present invention provide a computer-implemented method, a system, and a computer program product for providing dynamic live kernel updates with zero downtime in response to a memory crunch occurring. In contrast, conventional systems require additional overhead to support virtual machine management. Further, conventional systems are not able to provide a live kernel update if there is not enough memory in a local system. Conventional systems are also not able to dynamically provide live kernel updates with zero downtime in response to the memory crunch occurring. In particular, embodiments of the present invention acquire memory from an external entity through a high speed interconnect interface. Embodiments of the present invention also dynamically perform the LKU using the acquired memory and then release the acquired memory to the external entity.

Embodiments of the present invention include a highly computationally efficient system, method, and computer program product for providing a dynamic LKU operation with zero downtime. Accordingly, implementations of the present invention provide an improvement (i.e., technical solution) to a problem arising in the technical field of providing a LKU operation in response to a memory constraint being detected. In particular, embodiments of the present invention detect the memory constraint and acquire the memory from an external entity, which is different from conventional systems which require additional overhead and operations to perform memory management and LKU operations. Embodiments of the present invention also perform the LKU operation using the acquired memory and then release the acquired memory back to the external entity, which is different from the conventional systems which require additional overhead and operations to perform memory management and LKU operations.

Implementations of the present invention are necessarily rooted in computer technology. For example, the step of acquiring memory from an external entity and performing a LKU operation using the acquired memory is computer-based and cannot be performed in the human mind. Acquiring memory from the external entity and performing the LKU operation using the acquired memory is, by definition, performed by a computer and cannot practically be performed in the human mind (or with pen and paper) due to the complexity and massive amounts of operations involved. Given the scale and complexity of acquiring memory from an external entity and performing a LKU operation using the acquired memory, it is simply not possible for the human mind, or for a person using pen and paper, to perform the number of operations involved in acquiring memory and performing the LKU operation using the acquired memory.

Aspects of the present invention include a method, system, and computer program product for performing a LKU. For example, a computer-implemented method includes performing the LKU using external borrowed memory in response to a system not being capable of providing memory required for a successful completion of a live update. In another example, the computer-implemented method includes dynamically increasing a physical memory on a system during a live kernel update by acquiring memory from an external entity which adheres to cache coherency protocol. In further embodiments, the computer-implemented method utilizes the cache coherency protocol to ensure that the acquired memory is inserted into a real memory address space without any data inconsistency.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as live kernel update code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the present invention. In embodiments, the environment 205 includes a live kernel update (LKU) server 208, which may comprise one or more instances of the computer 101 of FIG. 1. In other examples, the LKU server 208 comprises one or more virtual machines or one or more containers running on one or more instances of the computer 101 of FIG. 1.

In embodiments, the LKU server 208 of FIG. 2 comprises a memory constraint module 210, a memory acquisition module 212, a live kernel update module 214, and a releasing memory module 216, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The LKU server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the present invention, the memory constraint module 210 receives a live kernel update command for performing a LKU operation from an external system, e.g., an external virtual machine within a cloud environment. In aspects of the present invention, the live kernel update command includes instructions for performing the LKU operation or planning to perform the LKU operation at a later timeframe. In further embodiments of the present invention, the LKU operation performs an update to an operating system (OS) within a computing system without rebooting the computing system. In embodiments, the memory constraint module 210 includes a virtual machine which communicates with a hypervisor to validate required resources (e.g., determining whether there is a memory constraint in the virtual machine) to spin off a new virtual machine (e.g., ambulance virtual machine) within the live kernel update module 214 during a LKU operation. For example, the memory constraint module 210 utilizes the hypervisor to initiate a next phase of acquiring memory in response to detecting the memory constraint. In other embodiments, as described below, the live kernel update module 214 completes the LKU operation in response to detecting that there is no memory constraint in the virtual machine. In this scenario, the memory acquisition module 212 does not acquire any memory from an external entity 218. In further embodiments, the hypervisor is within a software layer included in a virtualized environment. Details of the memory constraint module 210, the virtual machine, the new virtual machine, and the acquired memory are described in FIGS. 5-7.

Still referring to FIG. 2, the memory acquisition module 212 utilizes the hypervisor to communicate to the external entity 218 for sending the acquired memory to the primary system (i.e., the LKU server 208). In further embodiments, the memory acquisition module 212 utilizes the hypervisor to communicate to the external entity 218 through an existing hardware connection (e.g., OpenCAPI, CXL, etc.). In aspects of the present invention, the external entity 218 may be at least one of a storage class memory device and another system (e.g., field-programmable gate array (FPGA)) connected in a memory inception cloud setup. In further embodiments, the memory acquisition module 212 utilizes the hypervisor to allocate the acquired memory to the new virtual machine within the live kernel update module 214 to perform the LKU operation. In an aspect of the present invention, the memory inception cloud setup comprises a plurality of virtual machines which are able to access memory that is physically located on another virtual machine or a different host in a cloud computing environment. Details of the memory acquisition module 212 are described in FIG. 6.

In further embodiments of FIG. 2, the live kernel update module 214 performs the LKU operation on the new virtual machine with the acquired memory. In aspects of the present invention, the live kernel update module 214 performs the LKU operation on the new virtual machine within the live kernel update module 214 with zero downtime. In aspects of the present invention, the live kernel update module 214 performs a clean-up operation on the virtual machine of the memory constraint module 210 in response to completing the LKU operation on the new virtual machine within the live kernel update module 214 with the acquired memory. In an example of the clean-up process, the live kernel update module 214 frees the virtual machine, central processing unit (CPU) resources, memory resources, and network resources back to the primary system. In further embodiments, the live kernel update module 214 deletes the virtual machine and renames the new virtual machine with a name of the virtual machine. In other aspects of the present invention, the live kernel update module 214 completes the LKU operation in response to a determination that there is enough memory available in the virtual machine. Details of the live kernel update module 214 are described in FIG. 7.

In aspects of the present invention with regards to FIG. 2, the releasing memory module 216 has memory resources for the new virtual machine in response to the clean-up operation on the virtual machine being completed. In further embodiments, the releasing memory module 216 utilizes the hypervisor to move memory blocks and/or pages from the external entity 218 to memory of the primary system and frees up (e.g., releases) the acquired memory received from the external entity 218 in response to the clean-up operation on the virtual machine being completed. The releasing memory module 216 outputs a live kernel update result output to an external system (e.g., an external virtual machine within the cloud environment) in response to the releasing memory module 216 freeing up the acquired memory received from the external entity 218. In further embodiments, the live kernel update result output comprises a success message which indicates that the LKU operation has been successfully completed. Details of the releasing memory module 216 are described in FIG. 8.

Figure 3:
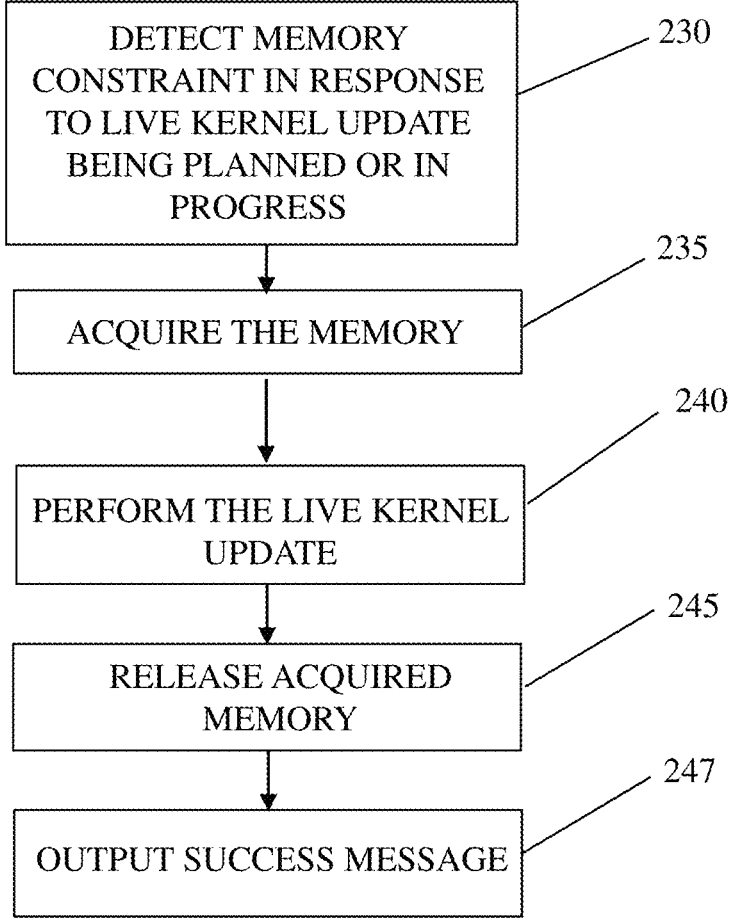
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At step 230, the system detects, at the memory constraint module 210, a memory constraint in response to a LKU operation being planned or in progress. In embodiments and as described with FIG. 2, the memory constraint module 210 spins off a new virtual machine (e.g., ambulance virtual machine) in response to detecting the memory constraint. In further embodiments, the memory constraint module 210 utilizes a hypervisor to initiate a next phase of acquiring memory in response to detecting a memory constraint.

At step 235, the system acquires, at the memory acquisition module 212, memory from an external entity 218. In embodiments and as described with FIG. 2, the memory acquisition module 212 utilizes the hypervisor to communicate to the external entity 218 through an existing hardware connection. In aspects of the present invention, the external entity 218 may be at least one of a storage class memory device and another system (e.g., field-programmable gate array (FPGA)) connected in a memory inception cloud setup.

At step 240, the system performs, at the live kernel update module 214, the LKU operation on the new virtual machine with the acquired memory. In embodiments and as described with FIG. 2, the live kernel update module 214 the LKU operation performs the LKU operation with zero downtime using the acquired memory from the external entity 218. In further embodiments, the live kernel update module 212 performs a clean-up operation on the virtual machine in response to completing the LKU operation on the new virtual machine with the acquired memory.

At step 245, the system releases, at the releasing memory module 216, the acquired memory received from the external entity 218 in response to the clean-up operation on the virtual machine being completed. In embodiments and as described with FIG. 2, the releasing memory module 216 utilizes the hypervisor to move memory blocks and/or pages from the external entity 218 to memory of the primary system.

At step 247, the system outputs, at the releasing memory module 216, a success message to an external system (e.g., an external virtual machine within the cloud environment) in response to the acquired memory being released. In embodiments and as described with FIG. 2, the success message indicates that the LKU operation has been successfully completed.

Figure 4:
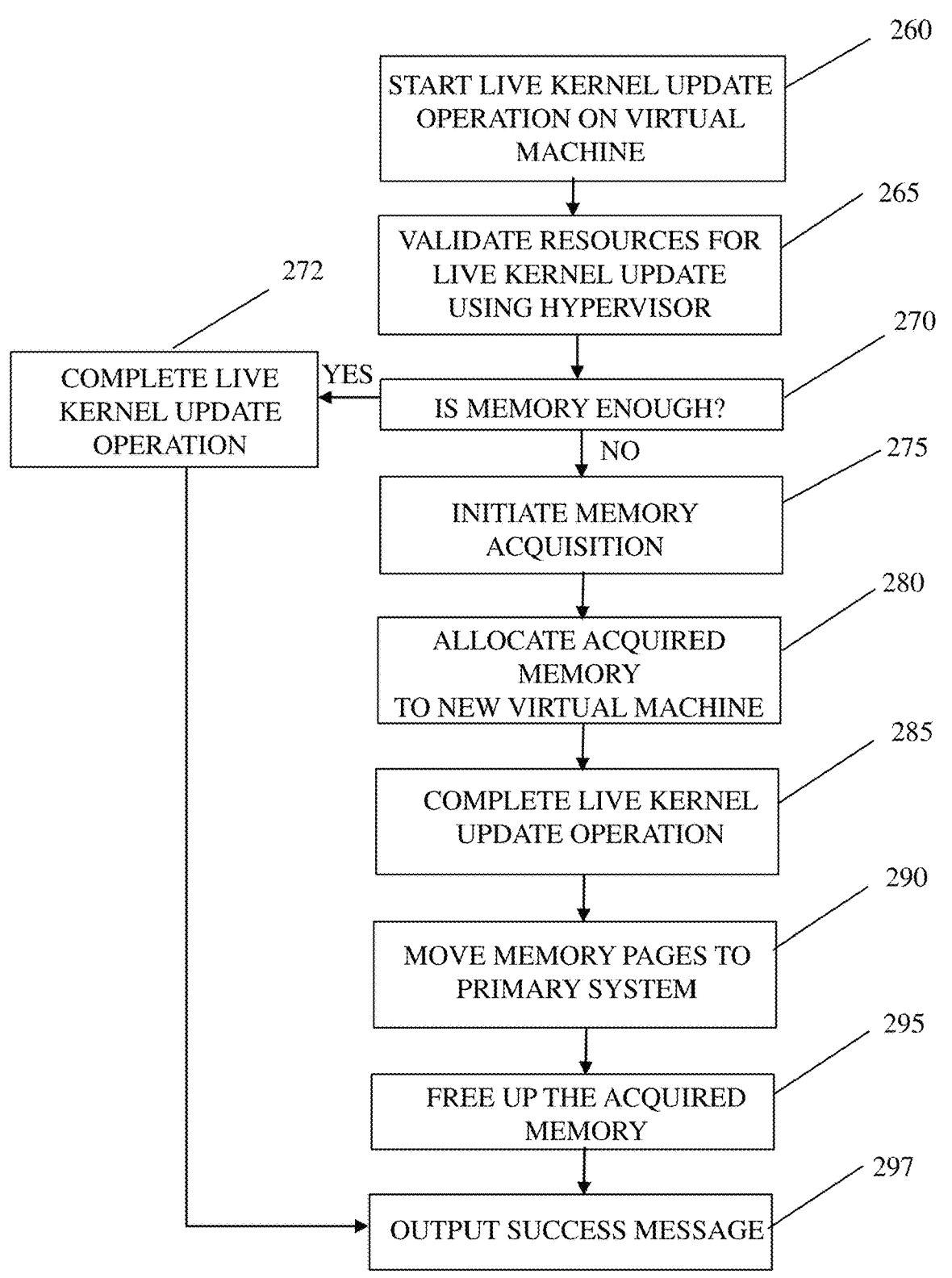
FIG. 4 shows a flowchart of an exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

At step 260, the system starts, at the memory constraint module 210, a LKU operation on a virtual machine. At step 265, the system validates, at the memory constraint module 210, resources for the LKU operation using a hypervisor. At step 270, the system determines, at the memory constraint module 210, whether there is enough memory of the virtual machine. In further embodiments, the memory constraint module 210 spins off a new virtual machine in response to a determination that there is a memory constraint of the virtual machine.

At step 272, the system completes, at the live kernel update module 214, the LKU operation in response to a determination that there is enough memory of the virtual machine. At step 297, the system outputs, at the releasing memory module 216, a success message which indicates that the LKU operation has been successfully completed.

At step 275, the system initiates, at the memory acquisition module 212, memory acquisition from an external entity 218 in response to a determination that there is a memory constraint (i.e., not enough memory) of the virtual machine. At step 280, the system allocates, at the memory acquisition module 212, the acquired memory to a new virtual machine of a primary system.

At step 285, the system completes, at the live kernel update module 214, the LKU operation on the new virtual machine. At step 290, the system moves, at the releasing memory module 216, memory pages from the external entity 218 to the primary system. At step 295, the system frees up, at the releasing memory module 216, the acquired memory received from the external entity 218. At step 297, the system outputs, at the releasing memory module 216, a success message which indicates that the LKU operation has been successfully completed.

Figure 5:
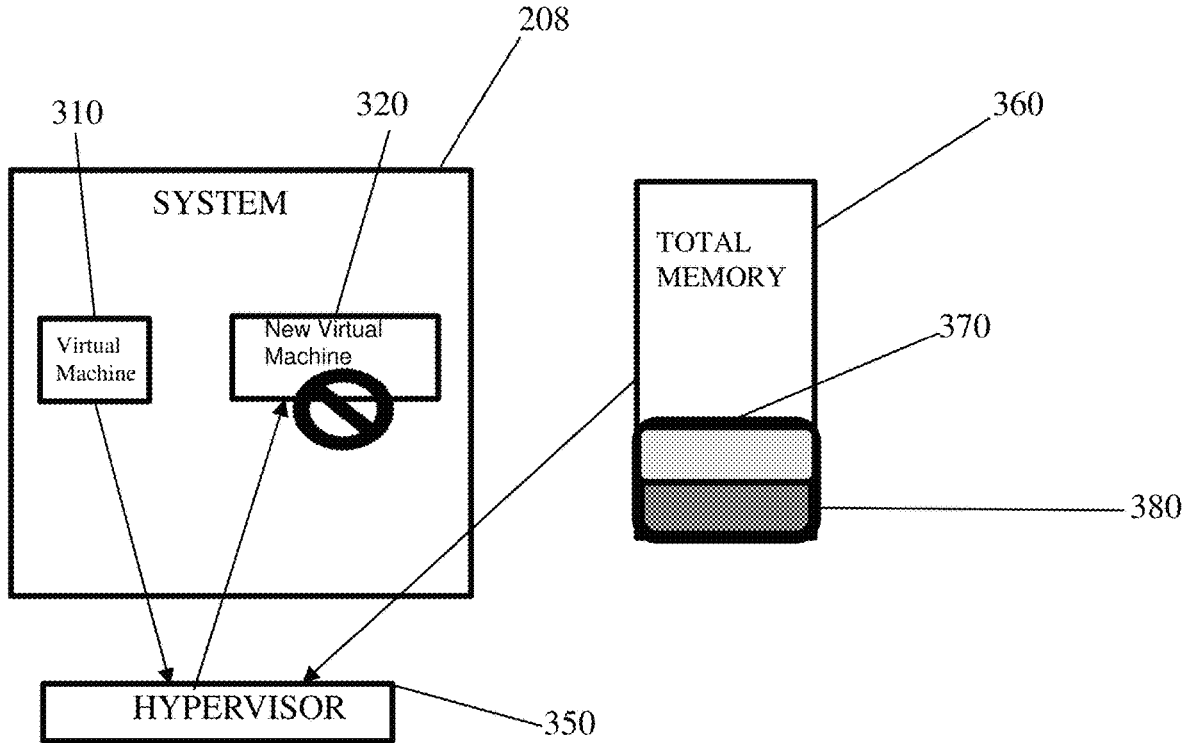
FIG. 5 shows a block diagram of detecting a memory crunch in accordance with aspects of the present invention.

FIG. 5 shows a block diagram of detecting a memory crunch in accordance with aspects of the present invention. In embodiments, a virtual machine 310 in the system (e.g., LKU server 208) is included in a memory constraint module 210 of FIG. 2. In further aspects of the present invention, a new virtual machine 320 in the system (e.g., LKU server 208) is included in the live kernel update module 214 of FIG. 2. In embodiments of the present invention, the system (e.g., LKU server 208) communicates with a hypervisor 350 to validate required resources (e.g., determining whether there is a memory constraint within a total memory 360). In further embodiments, the hypervisor 350 may determine that a memory needed 370 for the LKU operation is greater than a free memory available 380 (as shown in FIG. 5).

In an aspect of the present invention with regards to FIG. 5, the memory constraint module 210 spins off the new virtual machine 320 within the live kernel update module 214 in the system (e.g., LKU server 208) during the LKU operation. For example, the memory constraint module 210 utilizes the hypervisor 350 to initiate a next phase of acquiring memory in response to detecting a memory constraint (e.g., the memory needed 370 for the LKU operation is greater than the free memory available 380). In other embodiments, the memory constraint module 210 does not spin off the new virtual machine 320 within the live kernel update module 214 in response to not detecting the memory constraint (e.g., the memory needed 370 for the LKU operation is less than the free memory available 380). In this scenario, the live kernel update module 214 completes the LKU operation and the releasing memory module 216 outputs a live kernel update result output (e.g., success message) in response to a determination that there is enough free memory available 380 for the memory needed 370.

Figure 6:
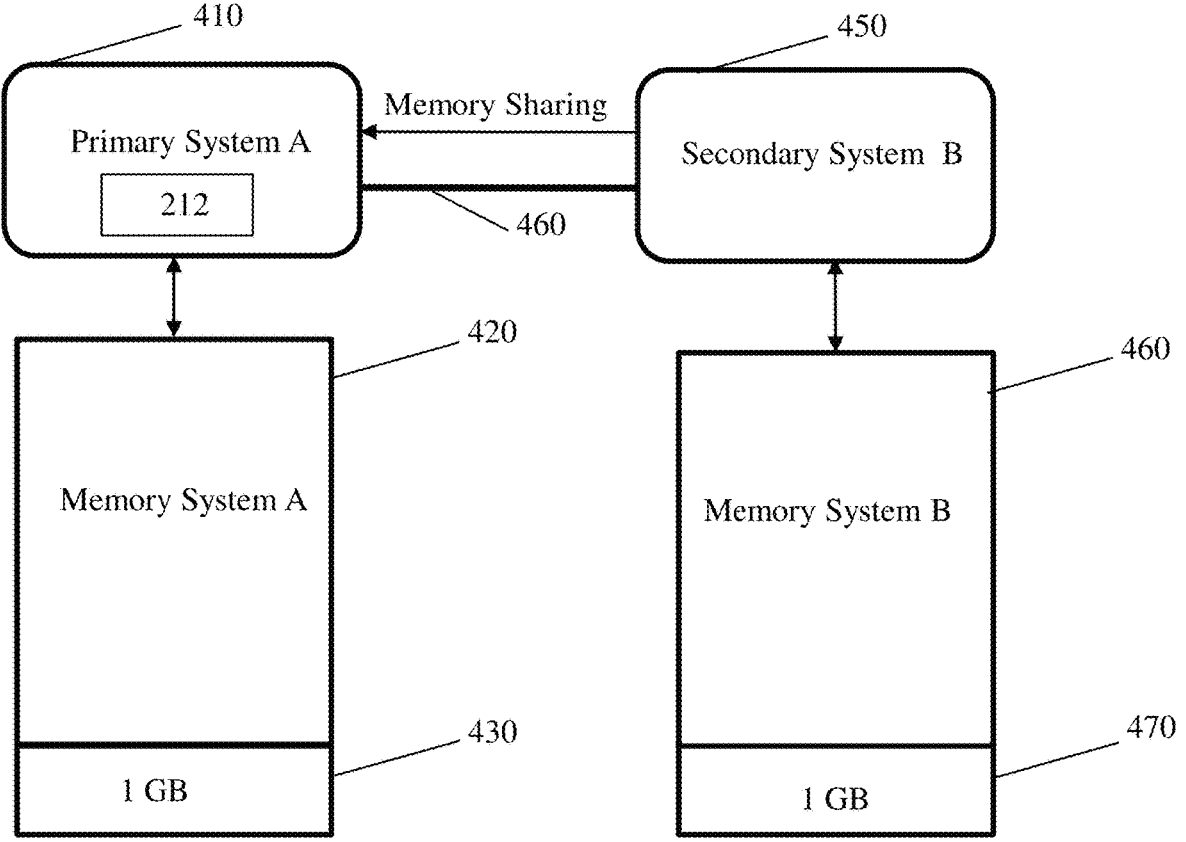
FIG. 6 shows a block diagram of acquiring a memory in accordance with aspects of the present invention.

FIG. 6 shows a block diagram of acquiring a memory in accordance with aspects of the present invention. In embodiments, a primary system A 410 includes the memory acquisition module 212 which communicates with a memory system A 420 including a memory 430 and a storage class memory B which communicates with a memory system B 460 including a memory 470. In further embodiments, the memory acquisition module 212 utilizes the hypervisor 350 so that a primary system A 410 communicates with a secondary system B 450 through a high speed connection 460. In embodiments, the high speed connection 460 comprises one of OpenCAPI, CXL, etc. According to an aspect of the present invention, the memory acquisition module 212 utilizes the hypervisor 350 to share memory 470 from a memory system B 460 with the primary system A 410. In further aspects of the present invention, the memory acquisition module 212 utilizes the hypervisor 350 to allocate the shared memory 470 to the new virtual machine 320 of FIG. 5 to perform the LKU operation at the primary system A. In further embodiments, the secondary system B 450 comprises a storage class memory. In other embodiments, the secondary system B 450 comprises a field-programmable gate array (FPGA).

Figure 7:
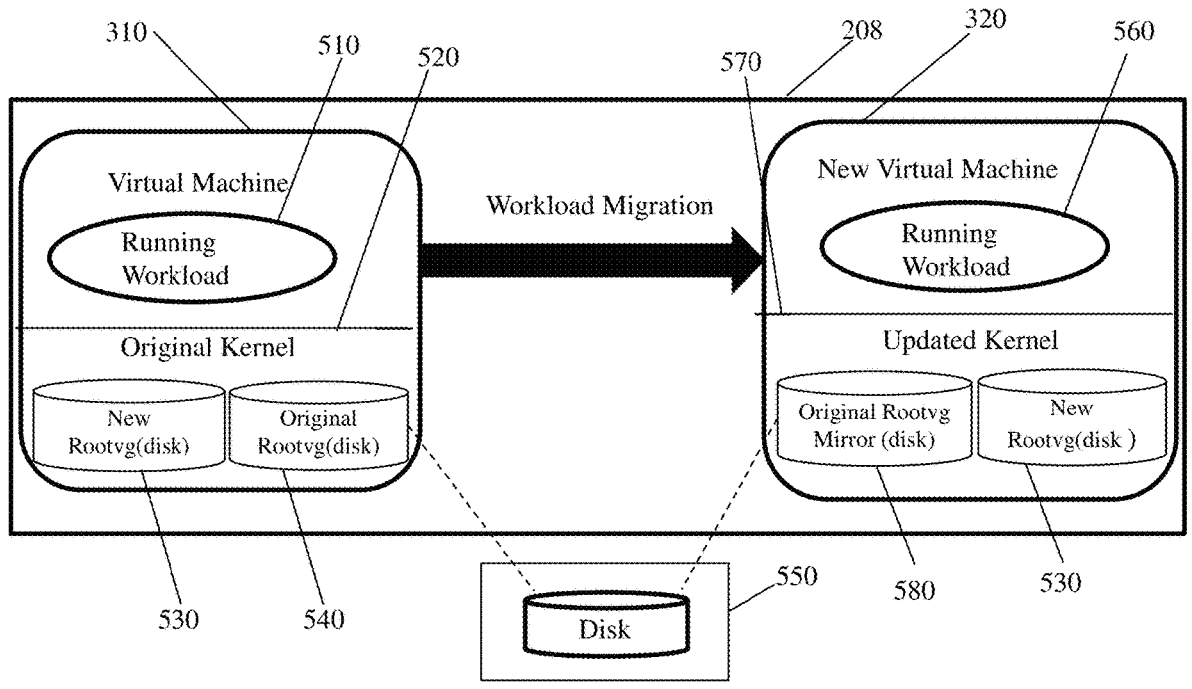
FIG. 7 shows a block diagram of performing a live kernel update (LKU) in accordance with aspects of the present invention.

FIG. 7 shows a block diagram of performing a live kernel update (LKU) operation in accordance with aspects of the present invention. In embodiments of FIG. 7, the virtual machine 310 is included in the memory constraint module 210 of FIG. 2 and the new virtual machine 320 is included in the live kernel update module 214 of FIG. 2. In further embodiments, the live kernel update module 214 communicates with the system (e.g., LKU server 208) which comprises the virtual machine 310 of FIG. 5 with a running workload 510 and an original kernel 520 with a new rootvg(disk) 530 and an original rootvg(disk) 540. In further embodiments, the new rootvg(disk) 530 is a new root volume group of a disk 550 which comprises a base set of logical volumes required to start the primary system A with other volumes that are specified in an install script. In aspects of the present invention, the original rootvg(disk) 540 is an original root volume group of the disk 550 which comprises the base set of logical volumes required to start the primary system A with other volumes that are specified in the install script. The system (e.g., LKU server 208) also comprises the new virtual machine 320 with a running workload 560 and an updated kernel 570 with the new rootvg(disk) 530 and the original rootvg mirror(disk) 580. In particular, the original rootvg mirror(disk) 580 is a mirrored version of the original rootvg(disk) 540. In aspects of the present invention, the disk 550 is included in the primary system A and is external to the system (e.g., LKU server 208).

Still referring to FIG. 7, the running workload 510 of the virtual machine 310 in the system (e.g., LKU server 208) is migrated to the running workload 560 of the new virtual machine 320. In embodiments, the live kernel update module 214 performs the LKU operation on the new virtual machine 320 with the allocated shared memory 470. In further embodiments, the live kernel update module 214 performs the LKU operation on the new virtual machine 320 with zero downtime. In aspects of the present invention, the live kernel update module 214 performs a clean-up operation on the virtual machine 320 in response to completing the LKU operation on the new virtual machine 320 with the allocated shared memory 470. In an example of the clean-up process, the live kernel update module 214 frees the virtual machine 310, central processing unit (CPU) resources, memory resources, and network resources back to the primary system A. In further embodiments, the live kernel update module 214 deletes the virtual machine 310 and renames the new virtual machine 320 with a name of the virtual machine 310. In other aspects of the present invention, the live kernel update module 214 completes the LKU operation in response to a determination that there is enough memory of the virtual machine 310.

Figure 8:
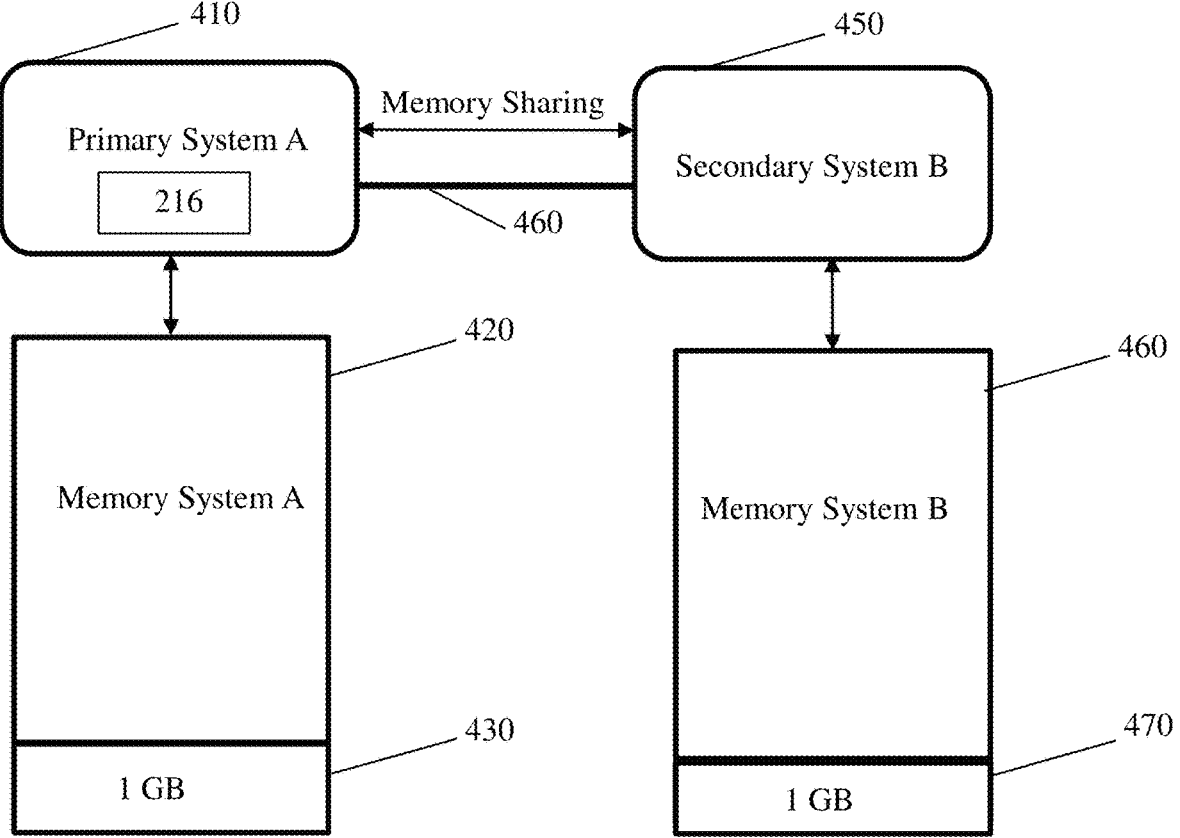
FIG. 8 shows a block diagram of releasing an acquired memory in accordance with aspects of the present invention.

FIG. 8 shows a block diagram of releasing an acquired memory in accordance with aspects of the present invention. In embodiments, the primary system A includes the releasing memory module 216. Further, the primary system A including the releasing memory module 216 has the allocated shared memory 470 for the new virtual machine 320 in response to the clean-up operation on the virtual machine being completed. In further embodiments, the releasing memory module 216 utilizes the hypervisor to move memory blocks and/or pages from the secondary system B 450 to the memory system A 420 of the primary system A 410 and frees up (e.g., releases) the allocated shared memory 470 received from the storage class memory B 450 in response to the clean-up operation on the virtual machine being completed. The releasing memory module 216 outputs a live kernel update result output (e.g., a success message) in response to the releasing memory module 216 freeing up the allocated shared memory 470 received from the secondary system B 450. In further embodiments, the live kernel update result output comprises the success message which indicates that the LKU operation has been successfully completed. In further embodiments, the secondary system B 450 comprises a storage class memory. In other embodiments, the secondary system B 450 comprises a field-programmable gate array (FPGA).

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting, by a processor set, a memory constraint in response to a live kernel update (LKU) operation being planned;
   acquiring, by the processor set, memory from an external entity through a hardware connection in response to detecting the memory constraint;
   performing, by the processor set, the LKU operation using the acquired memory from the external entity;
   releasing, by the processor set, the acquired memory; and
   outputting, by the processor set, a success message which indicates that the LKU operation has been successfully completed in response to the acquired memory being released.

2. The computer-implemented method of claim 1, wherein the external entity comprises a storage class memory device.

3. The computer-implemented method of claim 1, wherein the external entity comprises a field-programmable gate array (FPGA) connected in a memory inception cloud setup.

4. The computer-implemented method of claim 1, wherein the hardware connection comprises an open coherent accelerator processor interface (OpenCAPI) which is connected to the external entity.

5. The computer-implemented method of claim 1, wherein the hardware connection comprises a compute express link (CXL) which is connected to the external entity.

6. The computer-implemented method of claim 1, further comprising spinning off a new virtual machine in response to detecting the memory constraint.

7. The computer-implemented method of claim 6, wherein the performing the LKU operation comprises performing the LKU operation with the new virtual machine using the acquired memory.

8. The computer-implemented method of claim 1, further comprising performing a clean-up operation on a virtual machine in response to completing the LKU operation on a new virtual machine.

9. The computer-implemented method of claim 8, wherein the performing the clean-up operation on the virtual machine further comprises freeing up the virtual machine.

10. The computer-implemented method of claim 8, further comprising:

deleting the virtual machine; and renaming the new virtual machine with a name of the virtual machine.

11. The computer-implemented method of claim 1, further comprising moving memory pages from the external entity to a primary system which performs the LKU operation.

12. A computer program product comprising one or more computer readable storage media having program instructions collectively stored on the one or more computer readable storage media, the program instructions executable to:

detect a memory constraint in response to a live kernel update (LKU) operation being planned;

acquire memory from an external entity through a hardware connection in response to detecting the memory constraint;

perform the LKU operation using the acquired memory from the external entity;

release the acquired memory; and output a success message which indicates that the LKU operation has been successfully completed in response to the acquired memory being released.

13. The computer program product of claim 12, wherein the external entity comprises a storage class memory device.

14. The computer program product of claim 12, wherein the external entity comprises a field-programmable gate array (FPGA) connected in a memory inception cloud setup.

15. The computer program product of claim 12, wherein the hardware connection comprises an open coherent accelerator processor interface (OpenCAPI) which is connected to the external entity.

16. The computer program product of claim 12, wherein the hardware connection comprises a compute express link (CXL) which is connected to the external entity.

17. The computer program product of claim 12, further comprising spinning off a new virtual machine in response to detecting the memory constraint.

18. The computer program product of claim 17, wherein the performing the LKU operation comprises performing the LKU operation with the new virtual machine using the acquired memory.

19. The computer program product of claim 12, further comprising performing a clean-up operation on a virtual machine in response to completing the LKU operation on a new virtual machine.

20. A system comprising:

a processor set, one or more computer readable storage media, and program instructions collectively stored on the one or more computer readable storage media, the program instructions executable to:

detect a memory constraint in response to a live kernel update (LKU) operation being planned;

spin off a new virtual machine in response to detecting the memory constraint;

acquire memory from an external entity through an open coherent accelerator processor interface (OpenCAPI) in response to detecting the memory constraint;

perform the LKU operation on the new virtual machine using the acquired memory from the external entity;

release the acquired memory; and output a success message which indicates that the LKU operation has been successfully completed in response to the acquired memory being released.

* * * * *